United States Patent [19]

Lim et al.

[11] 4,206,085

[45] Jun. 3, 1980

[54] BALANCED ALUMINA MATRIX IN ZEOLITE CONTAINING CATALYST

[75] Inventors: John Lim, Anaheim; Dennis Stamires, Newport Beach; Michael Brady, Studio City, all of Calif.

[73] Assignee: Filtrol Corporation, Los Angeles, Calif.

[21] Appl. No.: 3,407

[22] Filed: Jan. 15, 1979

[51] Int. Cl.$^2$ .................... B01J 29/04; B01J 29/08
[52] U.S. Cl. ............................................... 252/455 Z
[58] Field of Search ................................. 252/455 Z

[56] References Cited

U.S. PATENT DOCUMENTS 4,086,187  4/1978  Lim et al. .................... 252/455 Z

*Primary Examiner*—Carl F. Dees
*Attorney, Agent, or Firm*—Philip Subkow; Bernard Kriegel

[57] ABSTRACT

This invention relates to an improvement in the abrasion resistance of catalysts formulated from a mixture of an exchanged zeolite of the faujasite type, hydrated alumina and ammonium polysilicate or silica sol.

12 Claims, 4 Drawing Figures

BALANCED ALUMINA MATRIX IN ZEOLITE CONTAINING CATALYST

BACKGROUND OF THE INVENTION

As has been shown that, hydrated alumina, for example pseudoboehmites, vary in their suitability for formulating catalysts including a zeolite and a matrix composed of clay and hydrated alumina, and prepared by spray drying the mixture, usually in the forms of microspheres.

As shown in our U.S. Pat. No. 4,086,187, the addition of the ionic polysilicate or a suitable silica sol to such a system employing a pseudoboehmite selected according to the peptizability index results in an improvement in the attrition index, as measured by an abrasion test described in said patent.

A similar observation relating to the utility of various pseudoboehmites is made in the Secor, et al, U.S. Pat. No. 4,010,116.

This patent describes a peptizability index which is somewhat different from the peptizability index of the U.S. Pat. No. 4,086,187. The pseudoboehmite against which the selection is made in both said patents have a relatively high sodium content. U.S. Pat. No. 4,086,187 shows that in a system employing a pseudoboehmite of acceptable peptizability index, the addition of ammonium polysilicate results in an improvement in abrasion resistance.

STATEMENT OF THE INVENTION

We have found that the incorporation of the aluminas which are rejected by the peptizability test of the above patents because of the unsuitable attrition resistance of the catalysts including these aluminas, have a materially useful property of increasing the pore volume and decreasing the bulk density of the microspheres.

We have now discovered that we may incorporate pseudoboehmites, which are rejected by the tests stated in the above U.S. Pat. No. 4,086,187, if the pseudoboehmite of peptizability found unsuitable by the test of said patent is modified so as to materially alter its rheological properties.

We have also found in zeolite-hydrated alumina systems that we may incorporate a substantial proportion of the total hydrated alumina in the system, in the form of pseudoboehmites which are rejected by the test of U.S. Pat. Nos. 4,086,187 or 4,010,116, if the rejected pseudoboehmite is modified in its rheological properties and particle size distribution.

We have found that another characteristic of a pseudoboehmite which distinguishes the pseudoboehmites which are rejected by the above peptizability tests from those which are found to be acceptable, is the effect of the addition of acid on the viscosity of the suspensions of the alumina.

Thus, for the purposes of conciseness, we classify a pseudoboehmite, which is suitable for incorporation into the above systems to give spray dried microspheres of good abrasion resistance, as a type A pseudoboehmite; and one which is not so suitable as a type B pseudoboehmite.

Type A pseudoboehmites are typified by those which are selected by the peptizability index in each of the above patents. For example, the Catapol alumina referred to in the Secor, et al., patent. Type B is typified by the pseudoboehmite against which the test selects. For example, the Kaiser alumina referred to said Secor, et al., patent.

When each of the above typical pseudoboehmites are dispersed in water, at a pH of 2.6 to give a dispersion of 7% solids content, the dispersions have viscosity as follows:

A typical A type alumina hydrate had a Brookfield viscosity of 3 centipoises; and A typical Type B alumina hydrate had a Brookfield viscosity of 6 centipoises.

When each of the slurries were milled by passage through the same colloid mill, to a degree measured by the rise in temperature of 15° F., the viscosities of the suspension were as follows:

Type A gave a Brookfield viscosity of 125 centipoises while Type B rose to 179 centipoises.

The dramatic difference between the above Type A and Type B aluminae was evidenced by their response to the action of formic acid. Thus, when the above dispersions, i.e., 7 grams of the pseudoboehmite (on a volatile free basis), was dispersed in water to give a total of 100 grams, and there was added to each dispersion, 0.67 ml of concentrated formic acid (90% pure) and the mixture was throughly mixed, the viscosity of the acidified slurry which has been agitated for 3 hours, tested by the Brookfield viscometer, gave the following results:

Table 1

|  | Type A | Type B |
| --- | --- | --- |
| Unmilled and acidified | 4630 centipoises | 7 centipoises |
| Milled and not acidified | 125 centipoises | 179 centipoises |
| Milled and then acidified | 2670 centipoises | 9 centipoises |

The effect of the acidification, in this case with formic acid on the rheological properties of Type B alumina is illustrated by the following:

A dispersion of 20 grams of Type B (volatile free basis) in 80 grams of deionized water, gave a Brookfield viscosity of 1,032 centipoises.

When milled, as previously described, the viscosity rose to 131,000 centipoises. On addition of the formic acid, as previously described, to the unmilled dispersion, the viscosity fell to 180, and when the formic acid, as above, is added to the milled dispersion, the viscosity fell to 32.

The effect of milling on the rheological properties of Type B pseudoboehmite is illustrated by the effect of the above milling on a slurry of Type B alumina on the particle size of the unmilled material.

The milled Type B was formed by passage of the above dispersion through a colloid mill until the temperature of the slurry rose 15° F. above the temperature of the unmilled slurry entering the milling process.

The following Table 2 gives the particle size distribution of the milled and unmilled product.

Table 2

Particle Size Distribution of Type B
Percent of Particles in Following
Ranges of Equivalent Diameters

| Range in microns | Percent Unmilled | Percent Milled |
| --- | --- | --- |
| less than 0.2 | 1 | 19 |
| 0.2 to less than 0.5 | 1 | 5 |
| 0.5 to less than 1 | 2 | 8 |
| 1 to less than 1.5 | 4 | 8.5 |
| 1.5 to less than 2 | 5 | 10.5 |
| 2 to less than 3 | 16 | 21 |
| 3 to less than 4 | 16 | 14.5 |
| 4 to less than 5 | 15 | 7.5 |

Table 2-continued

Particle Size Distribution of Type B
Percent of Particles in Following
Ranges of Equivalent Diameters

| Range in microns | Percent Unmilled | Percent Milled |
| --- | --- | --- |
| 5 to less than 6 | 9 | 3.5 |
| 6 to less than 7 | 7 | 2.5 |
| 7 to less than 8 | 4 | |
| 8 to less than 9 | 3 | |
| 9 to less than 10 | 3 | |
| 10 to less than 15 | 8 | |
| 15 to less than 20 | 3 | |
| 20 or more | 3 | |

Unmilled: 50% of the particles have equivalent diameters under 4 microns.

Milled but not acidified: 50% of the particles have equivalent diameters 1.9 microns and 90% under 4.3 microns. It will be seen that whereas in the unmilled Type B pseudoboehmite about 60% of the particles have equivalent diameters which are in the range of about 0.5 to 5 microns; about 2% are 0.2 or less microns, in the case of the milled Type B alumina, substantially all the particles (94%) have equivalent diameters less than 3 microns and 24% have diameters in the range under 0.5 microns.

The significant change is the appearance of a large increase in the particles of less than 0.2 microns. As shown above, 19% of all the particles are 0.2 microns or less.

Milling has made a material change in the distribution of particles. This is evidenced by the disappearance of the particles above 5 microns present in the unmilled alumina and the appearance of particles below 0.2 microns in the milled alumina, as well as the increase in the particles of 1 to 5 microns in the milled product.

The two forms of the pseudoboehmites, in their unacidified condition, whether or not they are milled, appear to have similar rheological properties, as measured by the Brookfield viscosimeter. The Type B alumina on milling has the content of particles of less than 0.2 microns which have been increased substantially, for example, 10% or more.

However, they respond substantially different on acidification.

In Type B, the acid flocculates the dispersion of the milled pseudoboehmite, reducing the viscosity of the milled alumina substantially to the viscosity of the unmilled alumina. The viscosity of the unmilled Type B alumina is not materially affected by acidification.

In the case of Type A, the addition of the acid, deflocculates the alumina, substantially increasing its viscosity. This occurs for both the unmilled and milled state of Type A. In both cases the Type A viscosity is substantially greater than the viscosity of the corresponding unpeptized state.

The above properties permit the identification of those pseudoboehmites which are found suitable and those which have not been found suitable for incorporation into such catalysts. For purposes of this application, we prefer to base our rules of selection of the aluminas for incorporation into catalysts of our invention on the response of the slurries of the alumina, on acidification under the conditions specified above.

We select for our purposes as Type A aluminas, those which on acidification of the dispersion in water, by the addition of formic acid (as specified above), result in an increase in viscosity of at least about 2 to 3 thousand times the unacidified dispersion measured by the Brookfield viscometer.

We select as the Type B aluminas for use in the catalyst of our invention, those whose water dispersion on acidification as above, have a Brookfield viscosity which is not substantially different than the unacidified viscosity of the unmilled dispersion.

For purposes of the selection of the aluminas as stated above, milling for testing of the effect of the acidification as above, to be the passage of the slurry to be tested through a colloid mill, as described above, sufficient to raise the temperature of the product by 15° F.

DETAILED DESCRIPTION OF THE INVENTION

Figure 1:
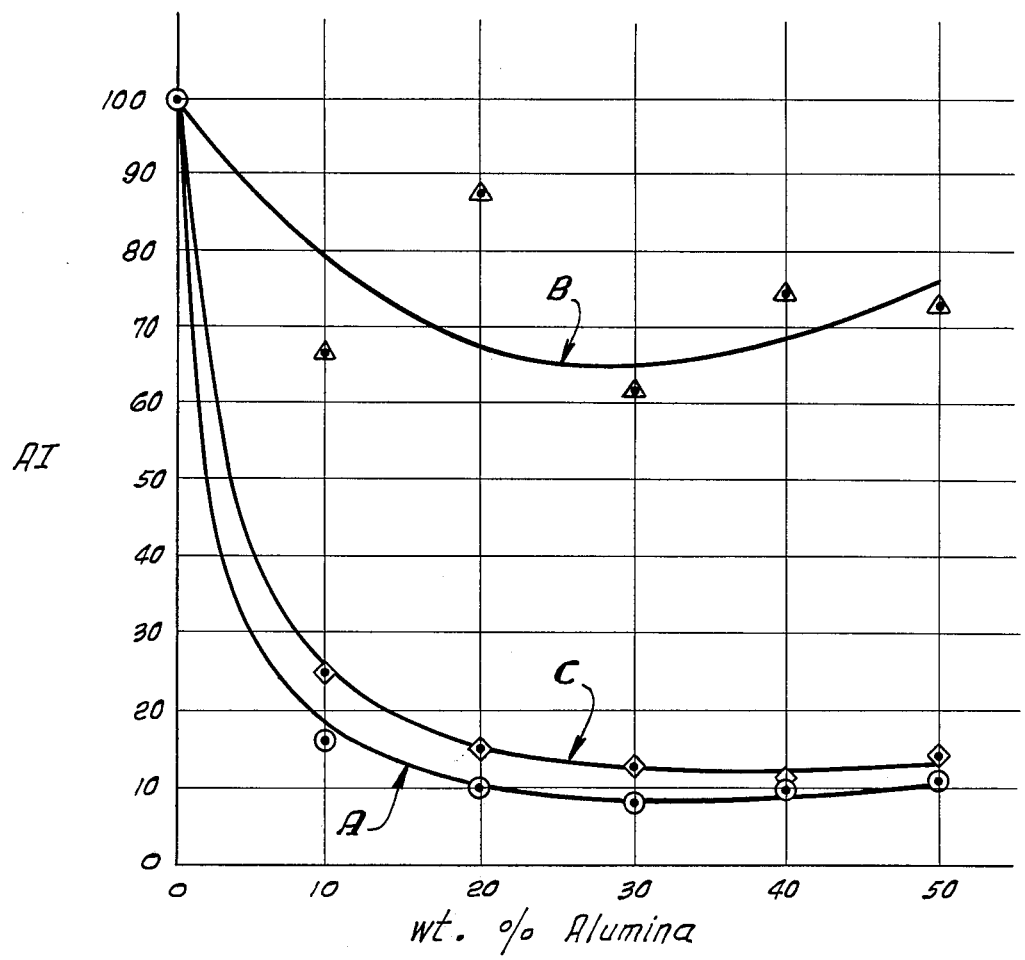

FIGS. 1-4 illustrate the effect of our invention on the attrition index.

The specification of U.S. Pat. No. 4,086,187 is incorporated herein by this reference.

As stated above, we have now discovered that instead of a Type B alumina having a disadvantageous effect in a zeolite-clay system on the attrition index of the spray dried microspheres, that if Type B alumina be milled, and whether or not it then is also acidified, it may be substituted for a part of the acidified Type A alumina in the aforesaid system, and result in an acceptable attrition index, without adversely affecting the catalytic activity.

The preferred acid for acidification is formic acid employing about 1.5 to 0.5% by weight of the formic acid in a water solution containing preferably to 0.7% by weight in water. The hydrated alumina is mixed with the above solution to give 20% of the alumina (volatile free basis) and 80% by weight of the above solution and the slurry is vigorously agitated for about 30 minutes.

Instead of the formic acid we may use other acids to produce like hydrogen ion concentration, preferably monobasic acids such as inorganic acids, for example, nitric acid or caboxylic acids such as acetic acids.

Where the term "acidified" is used in this specification and claims, we refer to the treatment of the pseudoboehmite with acid as above.

We have found that the attrition index is a function of both the ratio of Type A to the Type B alumina and on the sum of the percent of both aluminas and on the percent of the zeolite.

We have found that the incorporation of the Type B alumina has the beneficial effect of improving the hydrothermal stability of the catalyst. The activity of the catalyst is measured as M activity and S+ activity. The magnitude of the M activity is significant as to the activity of the catalyst when freshly introduced into the unit and the S+ activity and the difference between the M and S+ activity is related to the rate of deactiviation during use as a result of the environment in the reactant and regeneration zone.

The M and S and S+ activity may be measured by the microactivity cracking test described in the Oil and Gas Journal of Sept. 26, 1966, page 84, etc. and Nov. 22, 1975, page 60, etc.

In the following examples the conditions of the above test were as follows. The calcined pelleted catalyst was first steamed at temperatures and times specified below and then used in cracking of a petroleum fraction under the following conditions. Oil charge was a wide boiling range high sulfur feed stock (boiling range about 430° to 1000° F.). The catalyst to oil ratio equals 4. The weight hourly space velocity equals 16.45 grams of oil per gram of catalyst per hour. The temperature of the reactor is 910°. The percent conversion is reported as the volume of liquid condensate product of boiling point range of up to 421° F., based on the volume of liquid charge. The percent conversion after calcination of the catalyst in air three hours at 1050° F. and steamed for two hours at 1450° F. is termed M activity. When the calcined sample is steamed at 1500° F. for two hours, it is termed the S activity. When the calcined sample is first steamed for two hours at 1550° F., it is termed S+ activity.

The incorporation of Type B alumina in place of part of the Type A alumina has the effect of improving the pore volume over that obtained when using the acidified Type A alone. The deactivation of the catalyst by deposited carbon or metal poisons present in the oil being treated is minimized by such increased pore volume.

A further advantage of incorporating the Type B alumina is the decrease in the bulk density of the catalyst as compared with Type A alumina used exclusively.

We have been able to achieve a substantial increase in pore volume and a substantial decrease in the apparent bulk density by incorporating Type B alumina suitably prepared as the catalyst by using a mixture of such Type B alumina with Type A alumina.

The microspheres are designed for use in fluid cracking systems in which the catalyst is transported suspended in the reacting gases in the reactor and in the combustion gases in the regenerator and between these systems in a transport gaseous fluid.

It has been found that the bulk density of the catalyst particles is a material factor for this purpose. The bulk density which is accepted as a measure of the utility of the fluid cracking catalyst is the so called apparent bulk density (B.D.).

This is measured as the volume occupied by a mass of undisturbed particles. Commonly this is measured by pouring the particles into a graduate (for example, a 25 cc graduate) without disturbing them as they are poured in or before measuring the volume occupied. The bulk density is determined by weighing the graduate before and after introduction of the microsphere.

The catalyst of our invention is formed by spray drying a mixture of a zeolite, for example, mordanite or erionite but preferably of the faujasite type, for example X or Y zeolite (U.S. Pat. Nos. 3,282,244, 3,130,007 or U.S. Pat. No. 3,446,723), having a sodium content expressed as $Na_2O$ of less than about 5% by weight on a volatile free basis and other monovalent cations, for example, ammonium or hydrogen, or polyvalent cations such as an alkaline earth cation or a rare earth cation or both such a monovalent or polyvalent cation. The said catalyst contains said zeolite in combination with a matrix composed with hydrated alumina and also silica derived from either an ammonium polysilicate or a silica sol of average particle size of less than about 5 millimicrons. THe alumina may be either a Type A alumina preferably accidified, or a mixture of Type A and Type B alumina, said Type B alumina being preferably in the form of Type B-2 or B-3.

The catalyst is formed by drying, for example spray drying a slurry of the said zeolite, hydrated alumina and silica source and clay if used to form microspheres.

The acidification of Type A and Type B alumina may be carried out as described in U.S. Pat. No. 4,086,187 employing acids as stated in said patent. We prefer, however, to use the formic acid as stated in said patent for acidification.

In milling the Type B alumina the slurry of the Type B alumina is passed through a colloid mill. The temperature of the effluent from the mill rises.

As a result of the milling operation, the particles of the Type B alumina which ave an equivalent diameter of about 0.2 microns or less, increases as is illusstrated by the typical Type B alumina supra.

A convenient index of a suitably milled Type B is a rise in temperature which increases about 15° F. to about 30° F. Such milled Type B aluminas are herein referred to as Type B-2. In addition to Type B-2, we may employ Type B-2 alumina which has also been acidified, i.e., as described above, preferably with formic acid. Such Type B alumina is referred to as Type B-3. Type B-1 alumina is Type B in the acidified but unmilled state.

We have found that a superior result is obtained, by employing a Type B-2 alumina, identified as above, which has been milled as described above, to increase in substantial degree, the particles of equivalent diameter under 0.2 microns and a substantial reduction in the particles of equivalent diameter of over 2 microns or Type B-3, which has been acidified preferably with formic acid as described above, as the above B zeolite described above.

The catalyst of our invention comprises a zeolite as described and a matrix composed of alumina derived from an acidified Type a hydrated alumina or a mixture of the acidified Type A and Type B-2 alumina or a mixture of acidified Type A and Type B-3 alumina and $SiO_2$ derived from ammonium polysilicate or silica so having a silica particle of average size of less than 5 millimicrons. The said silica sol and ammonium polysilicate is identified and the method of preparation of the ammonium polysilicate is described in said U.S. Pat. No. 4,086,187. We prefer to employ the ammonium polysilicate for such purpose. We may also use kaolin clay in the above catalyst and prefer to do so.

Suitable compositions will include the above zeolite, alumina derived from acidified Type A or mixtures of acidified Type A and Type B-2 or acidified Type A and Type B-3 and $SiO_2$ derived from ammonium polysilicate or silica sol of average particle size of less tha 5 millimicrons and clay if used in the following ranges of percentage.

The catalyst contains a matrix which includes aluminas derived from about 10% to about 50% acidified, Type A or mixtures of acidified Type A and Type B in the form of Type B-2 or Type B-3 alumina, the percentages being based upon the catalyst including both the zeolite and the matrix on a volatile free basis. The ratio of the Type A to the Type B-2 or Type B-3 aluminas may range from about 10% of the weight of the mixture of aluminas in the form of Type B-2 or Type B-3, up to about 60%, preferably up to about 50% of the weight of the mixture of aluminas. We may use $SiO_2$ derived from ammonium polysilicate or silica sol of particle size of less than about 5 millimicrons in an amount from about 5 to 30% and clay, when employed, from about 10% to about 50%. All percentages are by weight on a volatile free basis, and the above component used in amounts so the total thereof in 100%.

The catalyst is formed by combining the ingredients with the zeolite, the aluminas, either the ammonium polysilicate or the silica sol and the clay when used in the aforesaid proportions and in a slurry which is thoroughly mixed and preferably homogenized and then spray dried to form microspheres of average particles of about 70 microns. For purposes of the attrition test and the activity test, the microspheres, after spray drying, are employed.

Our preferred catalyst is one with an attrition index (determined as described in U.S. Pat. No. 4,086,187) which is incorporated into this specification) of not more than about 25% and preferably about 20% or less. The concentration of the alumina, that is both the Type A or Type A and Type B, in the range of about 10% to 50% of the catalyst and from about 5% to about 25% of the silica derived from ammonium polysilicate or a silica sol of average particle size of less than about 5 millimicrons. The zeolite concentration may be from about 10% to about 30%. For this purpose we may employ about 10% to about 30% of a faujasite type zeolite, such as an X or Y zeolite, and in the latter case of $SiO_2/Al_2O_3$ molar ratio in excess of 4, for example, of about 4.5 to 5 molar ratio and a sodium content of less than about 5% based in the zeolite on a volatile free basis and containing other monovalent cations other than alkali metal cations or polyvalent cations, preferabley rare earth cations or both such monovalent cations and polyvalent cations.

We may employ, in the above formulations, the Type B alumina in its milled state, with or without subsequent acidification and to employ a weight ratio of the Type A alumina in acidified form to Type B alumina in either its milled or milled and acidified form in a ratio of about 40% to about 60% by weight in the mixture of Type B to 60% to 40% of Type A alumina in the mixture of Type A and Type B.

In order to obtain a catalyst of higher activity and greater attrition resistance, it is preferred to increase the concentration of the aluminas. Thus a percent of the aluminas Type A, or Type A and Type B (either B-2 or B-3) in excess of about 30%, i.e., about 30% to about 50% of the zeolite matrix mixture on a volatile free basis is preferred.

The following examples will illustrate our invention.

EXAMPLE 1

A zeolite of the substantially pure (95% plus) faujasite-type ($SiO_2/Al_2O_3$ greater than 4.8) which had been washed to a pH of 10.5 was acidulated with sulfuric acid to a pH of 3.5 in a slurry containing 10% of the zeolite on a volatile free basis. It was then exchanged at ambient room temperature with ammonium sulfate in a weight ratio of 0.7 of the ammonium sulfate to 1.0 of the zeolite, volatile free. The exchanged slurry was filtered to a solid content of approximately 45%. The filter cake was reslurried to a 10% solid content as above, with rare earth sulfate solution employing the sulfate of about 10% [expressed as rare earth oxide (REO)] of the weight of the zeolite on a volatile free basis at a pH of 4.5. The mixture was held at ambient room temperature for 30 minutes to an hour after which it was filtered and washed until no sulfate was detectable in the washing solution.

The filter cake, in addition to the $SiO_2$ and $Al_2O_3$ of the zeolite values, whose ratios are stated above, had the following analysis:
$Na_2O = 4.23$ wt.%
$REO = 10.2$ wt.%
$NH_3 = 1.20$ wt.%

The REO (rare earth oxides) was determined by the standard gravimetric oxalate method.

EXAMPLE 2

The zeolite of Example 1, was slurried to about 10% solids content (volatile free basis) with rare earth sulfate solution containing rare earth sulfate about equal to about 10%, measured as REO, of exchanged zeolite at a pH of 4.5, and held for about 30 minutes to about an hour. It was then filtered and washed until sulfate was no longer detectable in the wash water.

The filter cake in addition to the $SiO_2$ and $Al_2O_3$ of the zeolite had the following analysis on a volatile free basis ($SiO_2/Al_2O_3$ as above):
$Na_2O = 1.78$ wt.%
$ReO = 14.4$ wt.%
$NH_3 = 0.41$ wt.%

EXAMPLE 3

The sodium zeolite of Example 1, was exchanged with a rare earth sulfate, employing the sulfate in amount of the salt, evaluated as ReO, which was 10% by weight of the sodium Y at a pH of about 4.5, for about 30 minutes to an hour. It was filtered and then redispersed and exchanged a second time as above. The resultant double exchanged filter cake was heated as described in Example 2, and reslurried and reexchanged a third time as described above. The filter cake had the following analysis on a volatile free basis in addition to the $SiO_2$ and $Al_2O_3$:
$Na_2O = 2.20$ wt.%
$ReO = 17.9$ wt.%

EXAMPLE 4

This example illustrates the effect of unmilled Type A alumina, acidified with formic acid as stated above, on the attrition index, activity of the resultant catalyst formulated with various percentages of the accidified Type A. Another set of catalysts was formulated in a like manner employing Type b-3 alumina.

The zeolite of Example 1 was combined in the manner described in said U.S. Pat. No. 4,086,186 with Type A alumina, milled Type B then acidified (Type B-3), both acidified with formic acid as above, ball clay and ammonium polysilicate, made as described in said patent. The compositions are tabulated in Table 3. The mixtures were spray dried and subjected to the activity tests and attrition tests as described in said patent.

The observed data is stated in Table 3.

Table 3

| Catalyst Composition % by weight | | | | | | | | | | | |
|---|---|---|---|---|---|---|---|---|---|---|---|
| Type A (acidified) | 0 | 10 | 20 | 30 | 40 | 50 | | | | | |
| Type B-3 | | | | | | | 10 | 20 | 30 | 40 | 50 |
| Ball clay | 71.5 | 61.5 | 51.5 | 41.5 | 31.5 | 21.5 | 61.5 | 51.5 | 41.5 | 31.5 | 21.5 |
| Ammonium Polysilicate | 10 | 10 | 10 | 10 | 10 | 10 | 10 | 10 | 10 | 10 | 10 |
| Zeolite | 18.5 | 18.5 | 18.5 | 18.5 | 18.5 | 18.5 | 18.5 | 18.5 | 18.5 | 18.5 | 18.5 |
| M % Activity | 69 | 70 | 72 | 69 | 67 | 69 | 69 | 71 | 72 | 75 | 71 |
| S % Activity | 33 | 41 | 57 | 57 | 45 | 47 | 51 | 55 | 56 | 57 | 55 |

Table 3-continued

| S+ % Activity | 13 | 21 | 39 | 35 | 32 | 36 | 21 | 30 | 35 | 39 | 43 |
|---|---|---|---|---|---|---|---|---|---|---|---|
| A.I | 100 | 16 | 10 | 8 | 10 | 11 | 67 | 88 | 62 | 75 | 73 |
| S.A. $M^2$/gm* | | | | 267 | | 324 | | | | | |
| P.V. ml/gm* | | | | 0.29 | | 0.33 | | | | | |
| B.D.** | 0.76 | 0.80 | 0.86 | 0.85 | 0.81 | 0.86 | 0.66 | 0.61 | 0.62 | 0.55 | 0.52 |

*Surface area (S.A.) and Pore Volume determined by the method described in Brumauer, et al; J.A.C.S. (1938), p. 309, etc.
**Apparent Bulk Density in grams per cc.

The values of the Attrition Index of the catalysts including Type A alumina is plotted on FIG. 1 as Curve A and for the Type B alumina it is plotted as Curve B on FIG. 1.

EXAMPLE 5

Example 4 was repeated using, however, the zeolite of Example 2.

The observed data is tabulated on Table 4.

Table 4

| Catalyst Composition Volume % | | | | | | | | | | | |
|---|---|---|---|---|---|---|---|---|---|---|---|
| Type A (acidified) | 0 | 10 | 20 | 30 | 40 | 50 | | | | | |
| Type B-3 | 0 | | | | | | 10 | 20 | 30 | 40 | 50 |
| Ball clay | 65 | 55 | 45 | 35 | 25 | 15 | 55 | 45 | 35 | 25 | 15 |
| Ammonium Polysilicate | 10 | 10 | 10 | 10 | 10 | 10 | 10 | 10 | 10 | 10 | 10 |
| Zeolite | 25 | 25 | 25 | 25 | 25 | 25 | 25 | 25 | 25 | 25 | 25 |
| M % Activity | 71 | 77 | 78 | 77 | 76 | 80 | 75 | 78 | 81 | 79 | 84 |
| S % Activity | 41 | 65 | 70 | 69 | 73 | 72 | 57 | 54 | 69 | 74 | 76 |
| S+ % Activity | 8 | 25 | 38 | 39 | 45 | 42 | 25 | 31 | 36 | 45 | 44 |
| A.I. | 92 | 20 | 13 | 10 | 13 | 10 | 100 | 87 | 90 | 91 | 100 |
| S.A.$M^{-2}$/gm | 199 | | | 313 | | 394 | | | 313 | | 398 |
| P.V. ml/gm | 0.30 | | | 0.33 | | 0.41 | | | 0.53 | | 0.63 |
| B.D. | 0.78 | 0.78 | 0.82 | 0.84 | 0.78 | 0.80 | 0.64 | 0.58 | 0.57 | 0.52 | 0.50 |

Figure 2:
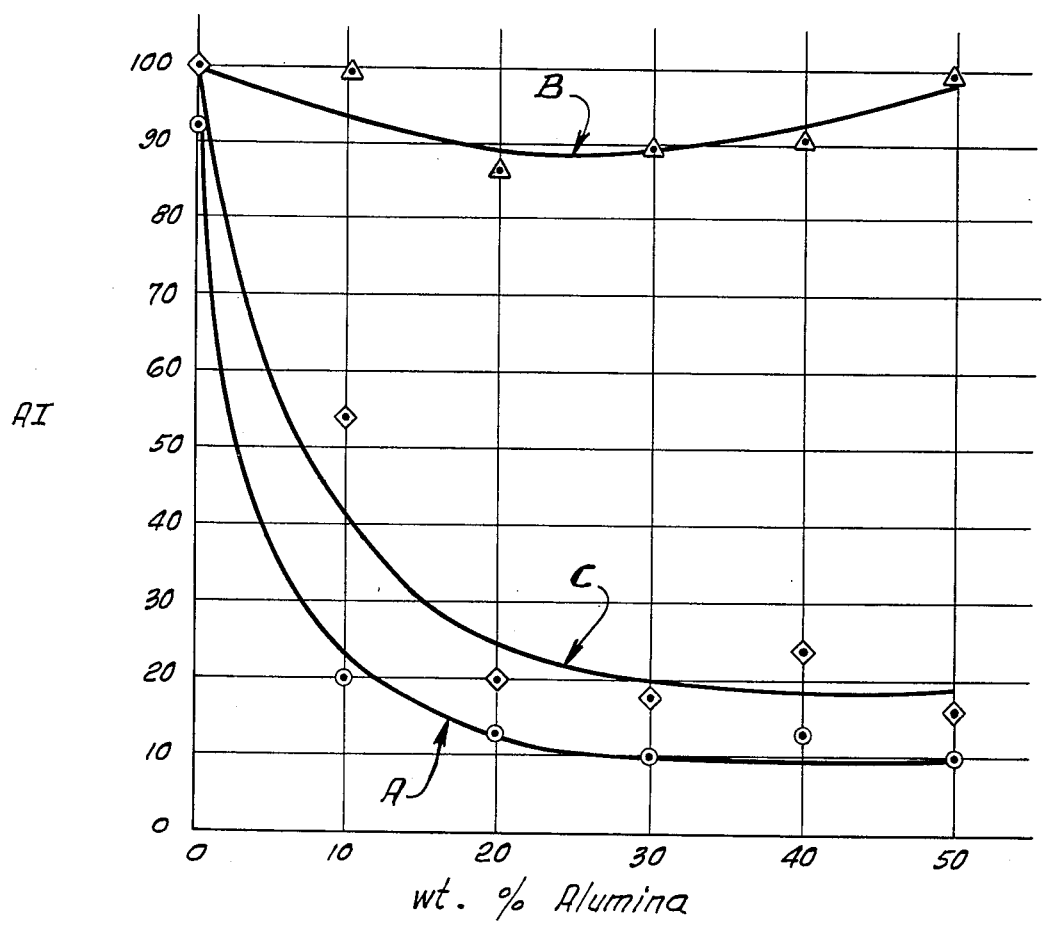

The values of the Attrition Index for the acidified Type A used alone, is plotted as Curve A and for Type B-3, used alone, is plotted as Curve B in FIG. 2.

EXAMPLE 6

Example 4 was repeated using, however the zeolite of Example 3. The observed data is stated in Table 5.

Table 5

| Composition % | | | | | | | | | | | |
|---|---|---|---|---|---|---|---|---|---|---|---|
| Type A (acidified) | 0 | 10 | 20 | 30 | 40 | 50 | | | | | |
| Type B-3 | | | | | | | 10 | 20 | 30 | 40 | 50 |
| Ball Clay | 65 | 55 | 45 | 35 | 25 | 15 | 55 | 45 | 35 | 25 | 15 |
| Ammonium Polysilicate | 10 | 10 | 10 | 10 | 10 | 10 | 10 | 10 | 10 | 10 | 10 |
| Zeolite | 25 | 25 | 25 | 25 | 25 | 25 | 25 | 25 | 25 | 25 | 25 |
| M% Actibity | 80 | 78 | 76 | 77 | 77 | 74 | 76 | 82 | 79 | 79 | 80 |
| S% Activity | 50 | 60 | 72 | 70 | 71 | 71 | 56 | 66 | 71 | 70 | 69 |
| S+% Activity | 17 | 22 | 40 | 34 | 41 | 45 | 21 | 32 | 46 | 42 | 39 |
| A.I. | 100 | 27 | 12 | 12 | 13 | 9 | 100 | 100 | 71 | 87 | 88 |
| S.A.$M^{-2}$/gm | 202 | | | 320 | | 378 | | | 320 | | 392 |
| P.V. cc/gm | 0.30 | | | 0.36 | | 0.40 | | | 0.49 | | 0.61 |
| B.D. | 0.77 | 0.78 | 0.84 | 0.79 | 0.78 | 0.81 | 0.67 | 0.62 | 0.58 | 0.54 | 0.58 |

Figure 3:
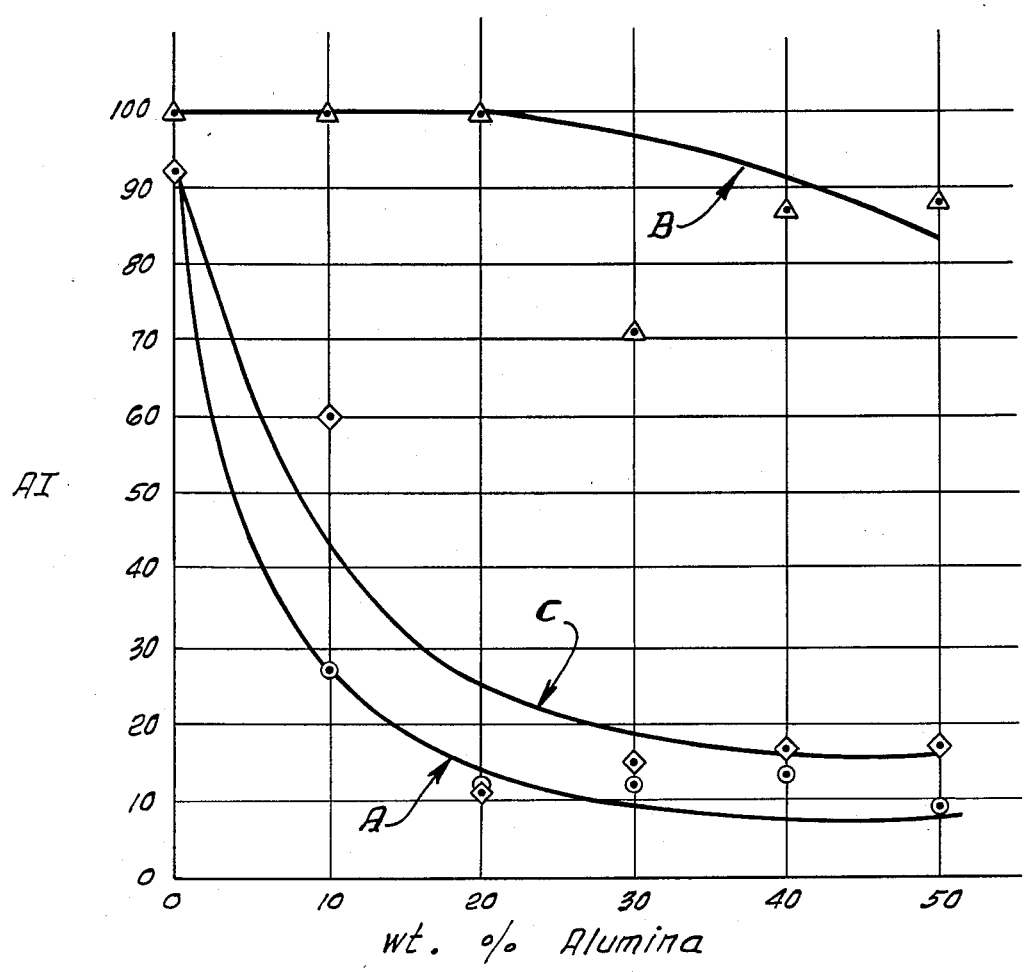

The values for the Attrition Index for Type B alumina is plotted on FIG. 3 as Curve A.

Reference to Tables 3, 4 and 5 and the Figures will show that the B-3 alumina if used in the place of the acidified Type A does not seriously change the catalytic properties in terms of activity as compared with the same catalyst formed deploying the acidified Type A alumina alone. The significant change, however, is in the serious deterioration of the catalyst attrition resistance that Type B alumina appears to act as a diluent and the attrition resistance of the catalyst is not improved over that of the catalyst which contains no Type B alumina.

It is thus surprising, that in mixtures of Type A and Type B alumina, the Type B, if used in the form of a milled or a milled and acidified Type B alumina, does not act as a diluent, but that there appears to be a synergistic effect. The mixture has a much lower attrition index than would be expected from the performance of the Type B alumina in the system. This is illustrated by the following examples.

EXAMPLE 7

Samples of Type A and Type B aluminas were prepared by dispersing the aluminas in deionized water.

The sample of Type A was unmilled and acidified with formic acid as described above. The Type B alumina was divided into three parts: Sample B-1 of Type B was unmilled and acidified and Sample B-2 of Type B was milled by passage through a colloid mill until the temperature of the dispersion which started at ambient temperature rose by about 15° F. Sample B-3 of Type B was a portion of the Sample B-2, acidified as above.

Catalysts were formulated from the above types as Samples A, B, C, D, E, F, G, H, I, and J using the above aluminas, employing ball clay as the clay and ammonium polysilicate produced as described in said patent except in the case of Sample J where the ammonium polysilicate was omitted.

Each of the mixtures of pseudoboehmites, when used with clay, the zeolite of Examples 3 above, were formulated in the proportions stated in the Table 6 below.

These were then spray dried as described in said Patent, and tested for the attrition index test. The M and S+ activity was determined.

TABLE 6

| Sample | A | B | C | D | E | F | G | H | I | J |
|---|---|---|---|---|---|---|---|---|---|---|
| % Zeolite % | 25 | 25 | 25 | 25 | 25 | 25 | 25 | 20 | 20 | 25 |
| Clay % | 25 | 25 | 25 | 25 | 15 | 15 | 15 | 20 | 20 | 25 |
| Polysilicate as SiO₂ % | 10 | 10 | 10 | 10 | 10 | 10 | 10 | 10 | 10 | 0 |
| Type A % | 40 | 35 | 20 | | 30 | 30 | 30 | 30 | 30 | 30 |
| Type B-1 % | | 5 | 20 | 40 | 20 | | | | | |
| Type B-2 % | | | | | | 20 | | 20 | | |
| Type B-3 % | | | | | | | 20 | | 20 | 20 |
| A.I. | 24 | 29 | 57 | 100 | 45 | 31 | 17 | 13 | 12 | 38 |
| M % | 76 | 80 | 80 | 80 | 82 | 78 | 78 | 76 | 76 | 85 |
| S+ % | 46 | 55 | 52 | 44 | 46 | 51 | 45 | 43 | 43 | |
| S.A. | 332 | 383 | 373 | 370 | 418 | 424 | 392 | | | |
| P.V. | 0.37 | 0.46 | 0.53 | 0.61 | 0.54 | 0.56 | 0.50 | | | |

Samples A–D (plotted in FIG. 4 as Curve B), illustrates the effect of the unmilled and acidified Type B (Type B-1) alumina on the attrition index of a catalyst of the above system.

The effect of the ammonium polysilicate to improve the attrition index is illustrated by Sample J (compare Samples G and J).

Type B aluminas imparts to the catalysts containing the acidified Type A an increase in the surface area and pore volume. Compare Examples B,C, and E through G with Example A. The improvement in pore volume, by substituting from about 10% to about 50% of the Type A alumina, is a significant improvement in the catalyst when employed as a cracking catalyst.

The incorporation of a portion of the aluminas such as B-2 or B-3 type has improved the pore volume, compare Example A with Example G and has resulted in a good attrition index of under 20%.

The effect of the concentration of the zeolites and of the alumina on the attrition index is shown by Example 8.

EXAMPLE 8

Twenty-four samples were prepared as in Examples 1-3 in which the mixture of Type B-3 and acidified and unmilled Type A alumina were varied from total absence of alumina (0) to 50% of the total catalyst mixture. Three sets of mixture were made. One was the zeolite of Example 1; another was the zeolite of Example 2; and the third was the zeolite of Example 3. Each of these zeolites were used in an amount equal to 25% of the total mixture. In the case of Example 4, the concentration of the zeolite of Example 1 was 18.5%. The alumina were composed of 3 parts of acidified Type A and 2 parts of Type B-3. The ammonium polysilicate was 10%, as SiO₂ and ball clay was used to make up 100%.

Table 7

| Zeolite % zeolite | Sample 1 Example 1 25 | | | | Sample 2 Example 2 25 | | | | Sample 3 Example 3 25 | | | | Sample 4 Example 1 18.5 | | | |
|---|---|---|---|---|---|---|---|---|---|---|---|---|---|---|---|---|
| %Al₂O₃ | AI | BD | M% | S+% | AI | BD | M% | S+% | AI | BD | M% | S+% | AI | BD | M% | S+% |
| 0 | 100 | 0.73 | 66 | 12 | 92 | 0.78 | 71 | 8 | 100 | 0.77 | 75 | 17 | 100 | 0.80 | 69 | 13 |
| 10 | 54 | 0.70 | 75 | 19 | 60 | 0.74 | 76 | 22 | 44 | 0.73 | 75 | 26 | 25 | 0.74 | 71 | 18 |
| 20 | 20 | 0.71 | 75 | 26 | 11 | 0.72 | 77 | 34 | 22 | 0.73 | 75 | 29 | 15 | 0.78 | 72 | 27 |
| 30 | 18 | 0.70 | 75 | 31 | 15 | 0.72 | 79 | 41 | 17 | 0.74 | 76 | 44 | 13 | 0.75 | 72 | 30 |
| 40 | 24 | 0.69 | 74 | 33 | 17 | 0.71 | 79 | 39 | 17 | 0.72 | 76 | 45 | 11 | 0.74 | 71 | 37 |
| 50 | 16 | 0.69 | 72 | 31 | 17 | 0.69 | 76 | 44 | 18 | 0.70 | 76 | 45 | 14 | 0.70 | 72 | 35 |

In FIG. 1 is plotted as Curve C, the data for Sample 4 of Table 7 and as Curve A, the data for Type A of Table 3 and Curve B, the data for Type B-3 of Table 3.

In FIG. 2 is plotted as Curve C, the data for Sample 1 in Table 7 and as Curve A, the data for Type A in Table 4, and, as Curve B, the data for Type B-3 in Table 4.

In FIG. 3 is plotted as Curve B, the data for Type B-3 in Table 5, and Curve A plots the data for Type A on Table 5, and Curve C plots the data for Sample 2 of Table 7.

Figure 4:
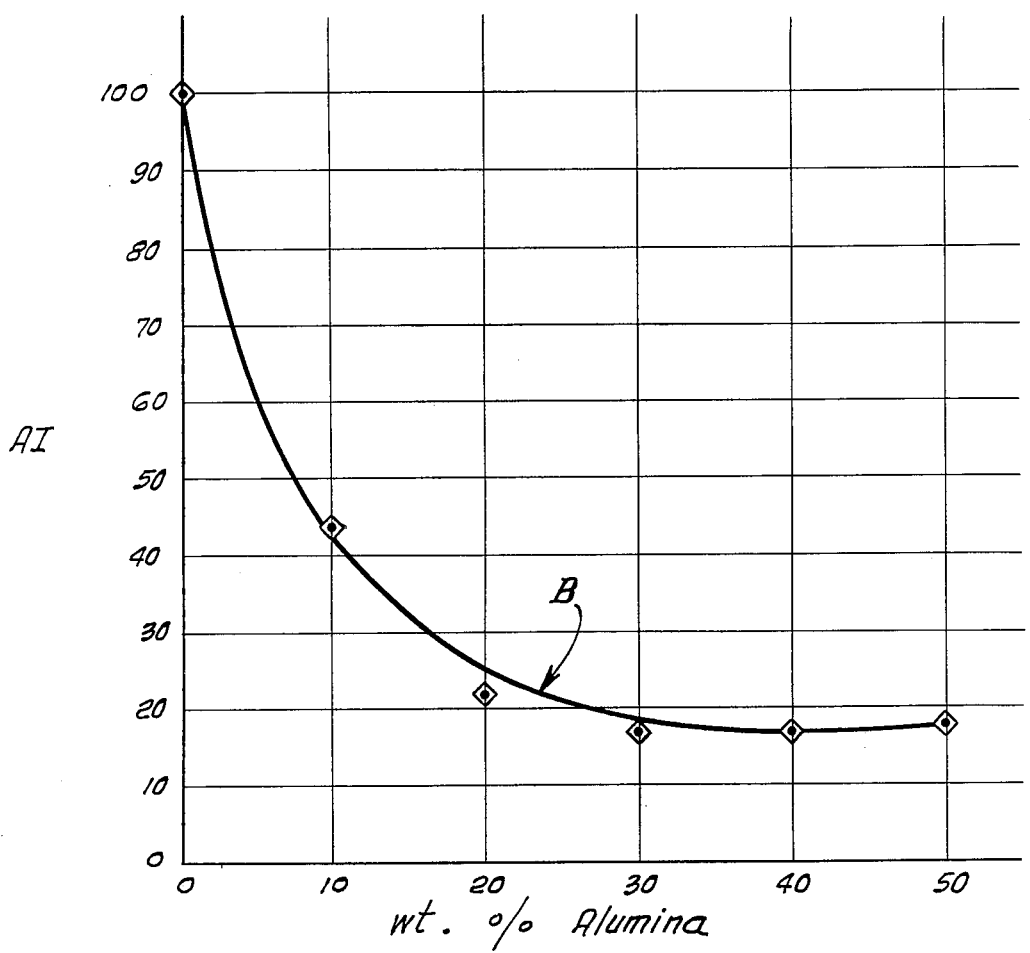

In FIG. 4 is plotted the data for Sample 3 of Table 7.

In all of the above Samples and Tables, the percentage figures and ratios of components, including the Type A and Type B alumina and the ammonium polysilicate (as SiO₂) are by weight, on a volatile free basis.

As appears from Tables 6 and 7, and FIGS. 1–4, part of the Type A alumina may be substituted by Type B-2 alumina, in the range of about 7% to about 60% of the Type A alumina with a substantial improvement over the attrition index when Type B-1 is used. The resultant AI in the region of 30, when B-2 alumina is used, while not as low as when Type B-3 is employed in the catalyst, as discussed below, it is a useful catalyst and compares favorably with commercial catalysts in which no ammonium polysilicate is employed.

The effect of milling of the Type B alumina is illustrated by Samples E and F in which the attrition index of 45, where Type B-1 alumina was used to replace a part of the Type A alumina as compared with the Attrition Index of 31 when the milled Type B-2 was employed. Employing the milled and also acidified Type B-3 alumina, a further improvement is obtained as is illustrated by comparing Example F and G where the AI is reduced from 31 to 17 by the use of the Type B-3 in place of Type B-2. The same degree improvement is not observed in Sample H and I which used the milled but not acid treated alumina, i.e., Types B-2 as used in Example 4 and the Type B-3 as used in Example I. It appears, as is shown in Table 7 and FIGS. 1–3 and Table 5 that the range of about 10-20 AI is a practical lower level of the AI index.

As appears from the above data, there is an improvement in the attrition index of the system where the acidified Type A is employed or the mixture of Type A and Type B is employed by increasing the concentration of the alumina up to about 15% for an AI of 30 or less to about 20% to 30% for an Attrition Index of 20 or less and that no substantial decrease in the index is obtained by increasing the concentration of the alumina, for example up to about 50% by weight.

The effect of the ammonium polysilicate is illustrated by Sample J of Table 6. The ommission of the polysilicate resulted in a much greater Attrition index as compared with a similar composition in which the polysilicate was used.

It is therefore an objective of our invention to employ in a catalyst composed of rare earth exchanged faujasite zeolite, clay and silica derived from ammonium polysilicate, or a silica sol containing particles of less than 5 millimicrons average diameter, or a mixture of acidified Type A alumina and acidified Type B-2 or an acidified Type A and Type B-3 alumina produced by spray drying a slurry containing the above components.

The inherent property of the Type B alumina to impart lightness, i.e., low Bulk Density, as compared with like compositions, including Type A alumina alone, is illustrated by the data of Tables 3, 4, 5 and 7. It will be seen that the substitution of a portion of the Type A alumina results in a substantial reduction of the Bulk Density (B.D.). We have discovered that we may thus reduce the Bulk Density of the alumina containing zeolite without any disadvantageous change in the attrition index or activity, which is attainable employing the Type A alone.

Our invention thus makes available for use a commonly available alumina to supplement the more expensive Type A aluminas, for example the above-referred to "Catapal" which is a trade name product of the Continental Oil Company. It is produced according to their literature by hydrolysis of an aluminum alkoxide, which in turn is produced by oxidation of an aluminum alkyl. The so-called B types are produced, it is understood, from sodium aluminate, from the Bayer process.

The substitution of the Type B for the Type A made possible by our invention, thus, not only improves the economics of the production of cracking catalysts, it also improves the functioning of the catalysts in the catalytic process by reducing there Bulk Density.

It is a further object of our invention to produce the Type B alumina employed in said mixture by milling the same to increase the particles of equivalent diameter which are under about 0.2 microns in excess of about 10% of the milled type alumina.

It is a further object of our invention to mix the milled Type B alumina with an acidified Type A alumina in the ratios of 5% to about 60% of the milled Type B alumina or Type B-3 alumina based on the mixture of Type A and Type B aluminas on a volatile free basis.

Our presently preferred embodiment is incorporated from 30 to 50% by weight of the acidified Type A and Type B-3 employing them in the ratio of about 3 to about 2 parts by weight (i.e. about 60% of the mixture as Type acidified A and about 40% of Type B-3) including about 10% (expressed as $SiO_2$) of the ammonium polysilicate and from about 10-30% weight of the an ammonium exchanged Y of $SiO_2 2/Al_2O_3$ ratio in excess of than 4 and ammonium and rare earth exchanged Y with $Na_2O$ less than about 4% based on the Y (volatile free bases) and the remainder ball clay.

The catalys of our invention in addition to its advantages as a cracking catalyst in fluid cracking catalyst, may also be used in other hydrocarbon conversion processes such as hydrocracking, hydroforming and hydrodesulfurizing and other hydrotreating processes. For such purposes it may have incorporated therein suitable promotors such as have been used with zeolite containing catalysts. The presence of a high content of alumina makes the catalyst suitable for the conversion of oxides of sulfur or by the addition of well known promotors, such as the platinum, palladium, and rhodium metals or their compounds, are useful in the oxidation of CO in the regeneration stages of the above conversion processes.

The catalyst employing the alumina according to our invention when used for cracking of distillate or residium fractions of crude oil containing substantial quantities of Ni, Va or rhodium metals or their compounds shows a good resistance to carbon formation and generation of $H_2$ as a result of the cracking action.

We claim:

1. A hydrocarbon conversion catalyst comprising a zeolite and a matrix, said matrix including alumina derived from pseudoboehmite, said pseudoboehmite composed of Type A and milled Type B aluminas, and $SiO_2$ derived from ammonium polysilicate or silica sol having particles of average particle size of less than 5 millimicrons.

2. A hydrocarbon conversion catalyst comprising a zeolite and a matrix, said matrix including more than about 15% by weight of alumina derived, from acidified pseudoboehmite, said pseudoboehmite composed of Type A and milled Type B aluminas, and from about 5 to 30% by weight of $SiO_2$ derived from ammonium polysilicate or silica sol having particles of average size less than 5 millimicrons and from 0% to about 30% of clay based on the weight of the zeolite and matrix on a volatile free basis.

3. A hydrocarbon conversion catalyst comprising from about 10% to about 30% of a zeolite more than about 15% of alumina derived from pseudoboehmite, said pseudoboehmite composed of Type A and milled Type B aluminas, and from about 5% to about 30% of $SiO_2$ derived from ammonium polysilicate or a silica sol of particles of average size less than 5 millimicrons, based on the weight of the zeolite and matrix on a volatile free basis.

4. A hydrocarbon conversion catalyst comprising a zeolite of the faujasite type having a $SiO_2/Al_2O_3$ molar ratio of more than 4 and sodium expressed as $Na_2O$ of less than about 5% of the zeolite on a volatile free basis and a matrix, said matrix including alumina derived from pseudoboehmite, said pseudoboehmite composed of Type A and milled Type B aluminas, and $SiO_2$ derived from ammonium polysilicate or silica sol having particles of average particle size of less than 5 millimicrons.

5. A hydrocarbon conversion catalyst comprising a zeolite of the faujasite type having an $SiO_2/Al_2O_3$ molar ratio in excess of 4 and sodium as $Na_2O$ of less than about 5% of the zeolite on a volatile free basis, and a matrix, said matrix including more than about 15% by weight of alumina derived from pseudoboehmite, said pseudoboehmite composed of Type A and milled Type B alumina, and from about 5 to 30% by weight of $SiO_2$ derived from ammonium polysilicate or silica sol having particles of less than 5 millimicrons and from 0% to about 30% of clay, said weigh percentage based on the weight of the zeolite and matrix in on a volatile free basis.

6. A hydrocarbon conversion catalyst comprising a zeolite and a matrix, said matrix including alumina derived from pseudoboehmite, said pseudoboehmite composed of Type A and milled Type B alumina, and SiO$_2$ derived from ammonium polysilicate.

7. A hydrocarbon conversion catalyst comprising a zeolite of the faujasite type having a SiO$_2$/Al$_2$O$_3$ molar ratio of more than 4 and sodium, expressed as Na$_2$O of less than about 5%, based on the zeolite on a volatile free basis, and a matrix, said matrix including alumina derived from pseudoboehmite, said pseudoboehmite composed of Type A and milled Type B aluminas, and SiO$_2$ derived from ammonium polysilicate.

8. A hydrocarbon conversion catalyst comprising from about 10% to about 30% of a zeolite of the faujasite type having an SiO$_2$/Al$_2$O$_3$ ratio in excess of 4 and sodium expressed as Na$_2$O, less than 5% by weight of the zeolite on a volatile free basis, more than about 15% of alumina derived from pseudoboehmite, said pseudoboehmite composed of Type A and milled Type B aluminas, and from about 5% to about 30% of SiO$_2$ derived from ammonium polysilicate based on the weight of the zeolite and matrix on a volatile free basis.

9. The catalyst of claims 1, 2, 3, 4, 5, 6, 7, or 8 in which the pseudoboehmite is an acidified Type A alumina.

10. The catalyst of claims 1, 2, 3, 4, 5, 6, 7, or 8, in which the pseudoboehmite is composed of acidified Type A and acidified and milled Type B alumina.

11. The catalyst of claim 1, 2, 3, 4, 5, 6, 7, or 8, in which the pseudoboehmite is composed of acidified Type A and milled Type B alumina, said Type A alumina being from about 10% to about 60% by weight of the Type A and milled Type B on a volatile free basis.

12. The catalyst of claim 1, 2, 3, 4, 5, 6, 7, or 8, in which the pseudoboehmite is composed of acidified Type A and Type B alumina, said Type A alumina being from about 10% to about 60% by weight of the Type A and milled and acidified Type B alumina on a volatile free basis.

* * * * *